(12) United States Patent
Brenden et al.

(10) Patent No.: US 6,917,172 B2
(45) Date of Patent: Jul. 12, 2005

(54) HARD DRIVE SPINDLE MOTOR CONTROLLER WITH REVERSE CURRENT PREVENTION

(75) Inventors: Jason P. Brenden, Woodbury, MN (US); Michael J. Peterson, Eagan, MN (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 10/614,262

(22) Filed: Jul. 7, 2003

(65) Prior Publication Data

US 2005/0007050 A1 Jan. 13, 2005

(51) Int. Cl.$^7$ ............................................... H02P 7/50
(52) U.S. Cl. ........................ 318/439; 318/293; 318/254; 360/69; 360/75
(58) Field of Search ................................ 318/138, 139, 318/245, 254, 439, 721, 599, 727, 290–293; 360/69, 75, 73.03

(56) References Cited

U.S. PATENT DOCUMENTS

| | | | | |
|---|---|---|---|---|
| 4,490,666 A | * | 12/1984 | Tanamachi et al. | 318/800 |
| 4,730,242 A | * | 3/1988 | Divan | 363/37 |
| 5,506,487 A | * | 4/1996 | Young et al. | 318/811 |
| 5,517,095 A | * | 5/1996 | Carobolante et al. | 318/254 |
| 5,625,264 A | * | 4/1997 | Yoon | 318/254 |
| 5,955,851 A | * | 9/1999 | Solie et al. | 318/254 |
| 6,020,695 A | * | 2/2000 | Kelly et al. | 318/254 |
| 6,023,136 A | * | 2/2000 | Pinewski | 318/254 |
| 6,150,788 A | * | 11/2000 | Someya | 318/685 |
| 6,288,507 B1 | * | 9/2001 | Makino et al. | 318/293 |
| 6,384,556 B1 | * | 5/2002 | Mizumoto et al. | 318/293 |
| 6,549,359 B1 | * | 4/2003 | Bennett et al. | 360/69 |
| 6,549,361 B1 | * | 4/2003 | Bennett et al. | 360/75 |
| 6,577,465 B1 | * | 6/2003 | Bennett et al. | 360/69 |
| 6,597,134 B2 | | 7/2003 | Brenden et al. | |
| 6,674,258 B2 | * | 1/2004 | Sakai et al. | 318/439 |
| 6,759,827 B2 | * | 7/2004 | Kawashima | 318/727 |
| 2002/0047683 A1 | * | 4/2002 | Kawashima | 318/721 |
| 2002/0195981 A1 | * | 12/2002 | Sakai et al. | 318/439 |
| 2003/0102834 A1 | | 6/2003 | Hussein | |
| 2004/0000884 A1 | * | 1/2004 | Inao et al. | 318/254 |

\* cited by examiner

Primary Examiner—Paul Lp
(74) Attorney, Agent, or Firm—Kinney & Lange, P.A.

(57) ABSTRACT

A motor controller for an electric motor having a plurality of motor terminals is connected to a power supply and comprises a commutation control, a current sensor, a peak target circuit, a pulse width control and a reverse current control. The commutation control is connected to the motor terminals for causing current pulses to flow through selected terminals during each commutation state. The current sensor provides a sense signal representative of the current pulses, and the peak current target circuit provides a target signal. The pulse width control controls pulse width of the current pulses as a function of the sense signal and the target signal. The reverse current control prevents reverse current from flowing into the power supply during change of commutation state.

19 Claims, 4 Drawing Sheets

HARD DRIVE SPINDLE MOTOR CONTROLLER WITH REVERSE CURRENT PREVENTION

CROSS-REFERENCE TO RELATED APPLICATION(S)

None.

BACKGROUND OF THE INVENTION

The present invention relates to a control circuit for controlling operation of a three-phase motor. In particular, the present invention is a hard drive spindle motor controller which eliminates reverse current into the power supply during commutation.

Spindle motors used in hard disc drives of computers are typically three-phase motors having three terminals. When a computer is first started, the hard drive spindle motor is typically spun up from a stopped condition by a motor controller circuit using six-state commutation, with peak current limiting and a relatively high motor current. To spin up the motor as quickly as possible, the start current is set as high as the hard drive power supply can deliver. In some systems, when the spindle motor approaches its normal operating speed, control of the spindle motor is transferred to a second motor controller circuit which provides sinusoidal drive to the three terminals using pulse width modulation.

Peak current limiting during spin up operates by allowing the current through the motor to ramp up to a programmed maximum as one terminal (through its motor driver) is tied to the operating high voltage and another terminal (through its motor driver) is tied through a sense resistor to the operating low voltage. While the terminals are tied or connected in this fashion, the motor current ramps up through the motor inductance and resistance between the two terminals. The motor current is measured by measuring the voltage across the sense resistor. When the current through the motor reaches the peak current, the two terminals (which had been connected to a high voltage and a low voltage) are connected to the same voltage. This allows the motor current to decay from the peak current value. Since the motor coil acts as an inductor, the motor current does not drop to zero instantaneously. Instead, the current decays at an approximately linear rate. Typically, the off time during which both terminals are connected to the same voltage is not long enough for the motor current to decay completely to zero. When the two motor terminals are switched back to the state where one terminal is at high voltage and the other is at low voltage, the motor current ramps up from that point until the peak current is again reached. Each time that peak current is reached, the two terminals are connected to the same voltage and motor current is allowed to decay.

During the spin up phase of operation, the current flowing through the motor from the high operating voltage to the low operating voltage is seen across the sense resistor as a series of short, nearly rectangular pulses. The current is only drawn from the power supply (or a supply bypass capacitor in parallel with the power supply) when the two terminals are in the state where they are connected to different voltages. When the two terminals are connected to different voltages, the current flow is from the power supply into the high voltage terminal, through the motor, and out the low voltage terminal of the motor and through the sense resistor to ground. When the two terminals are both connected to the high operating voltage, the current flow is from the power supply node into the high voltage terminal, through the motor, and back to the power supply node. Therefore, no motor current is drawn from the power supply or bypass capacitor. Current does flow from the power supply into the bypass capacitor during this time. Thus, the current draw is represented by the voltage pulses across the sense resistor. The supply bypass capacitor tends to filter these narrow supply current pulses, which reduces the peak load current seen by the power supply. An average motor current is set by the alternation between the two states in which a pair of motor terminals are connected to high and low voltage or to the same voltage.

At commutation (which occurs every sixty degrees of rotation) the motor drive circuit switches motor phases so that a different pair of terminals of the three motor terminals are used for connection to the operating high voltage and the operating low voltage. While commutating the motor and limiting the current with a one-shot (which allows motor current to decay for a fixed amount of time), a problem may occur at a commutation point. If the motor is being driven in any given state by holding one terminal high, one terminal floated, and one terminal pulse width modulated low in order to control current, a problem may occur at a commutation of the high terminal. While commutating to a new high terminal, the old high terminal will continue to pull current from ground through its motor driver. If the one-shot was fired prior to the commutation, the low terminal would be in the high state of its pulse width modulation. The new high terminal will be held high and therefore all the current in the inductance will be dumped into the power supply. This reverse current may cause stability problems for lower cost power supplies. In the past, more expensive power supplies able to withstand the reverse current, or larger bypass capacitors able to absorb the reverse current were used to address this problem. Both approaches result in a more expensive spindle motor system.

BRIEF SUMMARY OF THE INVENTION

The present invention is a motor controller for an electric motor having a plurality of motor terminals. The motor controller is connected to a power supply and comprises a commutation control, a current sensor, a peak target circuit, a pulse width control and a reverse current control. The commutation control is connected to the motor terminals for causing current pulses to flow through selected terminals during each commutation state. The current sensor provides a sense signal representative of the current pulses, and the peak current target circuit provides a target signal. The pulse width control controls pulse width of the current pulses as a function of the sense signal and the target signal. The reverse current control prevents reverse current from flowing into the power supply during change of commutation state.

DETAILED DESCRIPTION

Figure 1:
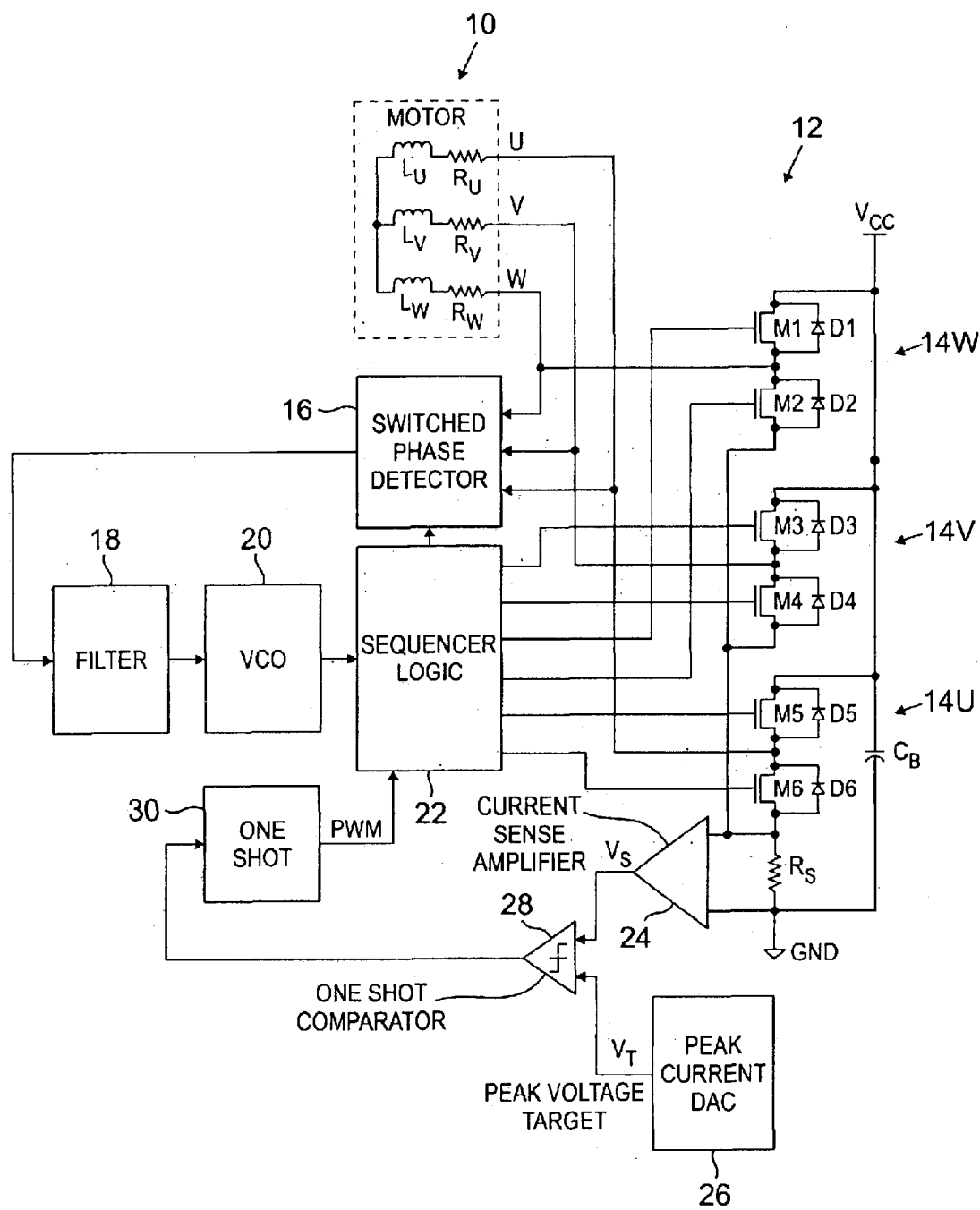
FIG. 1 is a block diagram of a prior art motor controller for a three-phase motor.

FIG. 1 is a block diagram showing three-phase motor 10 and prior art motor controller 12. Three-phase motor 10 is, for example, a spindle motor used in a hard disc drive. Prior art motor controller 12 allows motor 10 to spin up rapidly from a stopped condition to its normal operating speed using six-state commutation with peak current limiting. In some embodiments, once motor 10 approaches normal operating speed, a sinusoidal motor controller (not shown) takes over control of motor 10.

Three-phase motor 10 has three terminals labeled U, V, and W, three stator coils $L_u$, $L_v$, and $L_w$ and associated internal resistance $R_u$, $R_v$, and $R_w$. As motor 10 spins, a voltage called the Back ElectroMotive Force (BEMF) is generated by moving the motor magnetic fields through coils $L_u$, $L_v$, and $L_w$. Voltages at terminals U, V, and W change due to this BEMF voltage. The three terminal voltages have the general shape of sinusoids, which are displaced by 120 degrees relative to each other. At the end of 360 degrees, the terminal voltages have returned to their original voltages.

The following information is a result of these three sinusoidal terminal voltages: for the first 120 degrees, terminal U has the lowest voltage of the three terminals; for the second 120 degrees, terminal V has the lowest voltage; and for the last 120 degrees, terminal W has the lowest voltage. For the first 60 degrees, terminal V has the highest voltage; for the next 120 degrees, terminal W has the highest voltage; for the next 120 degrees, terminal U has the highest voltage; and for the last 60 degrees, terminal V has the highest voltage. For the first 60 degrees, terminal W has an intermediate voltage (which is neither the highest nor the lowest voltage); for the next 60 degrees, terminal V has an intermediate voltage; and for the next 60 degrees, terminal U has an intermediate voltage. This pattern of intermediate voltage repeats between 180 degrees and 360 degrees. This is shown in Table 1 below:

TABLE 1

| Commutation State | 1 | 2 | 3 | 4 | 5 | 6 |
|---|---|---|---|---|---|---|
| | | 60° | | 180° | | 300° |
| High Voltage | V | W | W | U | U | V |
| In Between | W | V | U | W | V | U |
| Lowest Voltage | U | U | V | V | W | W |
| | 0° | | 120° | | 240° | 0° |

Motor controller 12 includes motor drivers 14U, 14V and 14W, switched phase detector 16, filter 18, voltage controlled oscillator (VCO) 20, sequencer logic 22, bypass capacitor CB, current sense resistor $R_S$, current sense amplifier 24, current control digital-to-analog convertor (DAC) 26, one-shot comparator 28, and one-shot 30. Power to motor controller 12 is supplied from a power supply (not shown) through power supply terminals VCC and GND.

Each motor driver 14U, 14V, 14W is a half bridge switching circuit formed by a pair of MOSFET switches and associated diodes. Motor driver 14W is formed by switches M1 and M2 and diodes D1 and D2. M1 has its drain connected to terminal VCC and its source connected to motor terminal W. M2 has its drain connected to terminal W and its source connected through sense resistor $R_S$ to terminal GND. The gates of M1 and M2 are connected to sequencer logic 22.

Motor driver 14V is formed by MOSFETS M3 and M4 and diodes D3 and D4. The drain of M3 is connected to terminal VCC, and the source of M4 is connected through sense resistor $R_S$ to terminal GND. The source of M3 and the drain of M4 are connected to motor terminal V. Sequencer logic 22 is connected to the gates of M3 and M4.

Motor driver 14U is formed by MOSFETS M5 and M6 and diodes D5 and D6. The drain of M5 is connected to terminal VCC, and the source of M6 is connected through sense resistor $R_S$ to terminal GND. The source of M5 and the drain of M6 are connected to motor terminal U. The gates of M5 and M6 are connected to the output of sequencer logic 22.

The inputs of switched phase detector 16 are connected to motor terminals U, V and W. The undriven phase of motor 10 is monitored by switched phase detector 16 and is compared against the average of the three phases. The output of switched phase detector 16 is connected through filter 18 to the input of VCO 20. The output of VCO 20 is supplied to the input of sequencer logic 22. Together, switched phase detector 16, filter 18, VCO 20 and sequencer logic 22 form a phase locked loop circuit which determines when to commutate motor 10 by controlling the operation of motor drivers 14U, 14V and 14W.

Switched phase detector 16 also receives signals from sequencer logic 22 which indicate each time the commutation state changes and identify the current commutation state. Based on those signals, switched phase detector 16 compares the voltage at the undriven terminal (e.g. W in commutation state 1 from 0° to 60°) with an average voltage from all three terminals. The result of the comparison is exclusively ORed with a signal identifying even (or odd) commutation states.

The output of switched phase detector 16 is a signal which is proportional to the phase error. If motor 10 is in a steady state condition (i.e. the speed is not changing), the duty cycle of the output of switched phase detector 16 is 50%. During spin up, motor speed is increasing, and the duty cycle of switched phase detector 16 causes pumping up of filter 18 on average.

VCO 20 produces a clock signal which is a function of the voltage received from filter 18. As motor speed is increasing, filter 18 is pumped up on average, and therefore the clock signal from VCO 20 increases in frequency. The clock signal from VCO 20 is divided down by sequencer logic 22 and is used to determine each change of commutation state. For example, if VCO 20 produces a clock pulse for each 6 degrees of motor rotation, sequencer logic 22 divides the VCO clock signal frequency by ten to define a commutation state change every 60 degrees of rotation. The VCO clock signal also may be used to determine when to switch from spin up to sinusoidal motor control, since the VCO clock frequency varies with motor speed.

During spin up operation, MOSFETs M1–M6 are pulsed in time with motor 10 to maintain or increase the motor speed. For the 120 degrees of rotation (i.e. two commutation states) during which one terminal has the highest voltage, that terminal is tied to VCC through its associated motor driver 14U, 14V or 14W. For example, between 60° and 180° (commutation states 2 and 3) as shown in Table 1, terminal W has the highest voltage. During those 120 degrees, sequencer logic 22 turns on M1 and turns off M2 of motor driver 14W. As a result, terminal W of motor 10 is connected through M1 to VCC.

For the 60 degrees of rotation (i.e. one commutation state) that a terminal has an intermediate voltage, that terminal is floating, and both MOSFET switches associated with that terminal are off. For example, during commutation state 2 (between 60° and 120°) in Table 1, terminal V has the intermediate voltage. In that case, sequencer logic 22 has turned off MOSFETs M3 and M4 so that terminal V is not connected to either VCC or GND. During a commutation state when a terminal is left floating, its voltage is monitored by switched phase detector 16.

For the 120 degrees (two commutation states) that a terminal has the lowest voltage, that terminal is pulse width modulated. During pulse width modulation, the terminal is switched between the low voltage (connected through sense resistor $R_S$ to terminal GND) and the high voltage (connected to terminal VCC). When the terminal is switched to low voltage, the inductance between the high and low terminals charges and the motor current rises. When the terminal having the lowest voltage is switched to the high voltage (terminal VCC), the inductances discharge and motor current falls. Average current through motor 10, which controls motor torque, is controlled by this method.

In the example shown in Table 1, terminal U has the lowest voltage in commutation states 1 and 2 (between 0° and 120°). During that time, sequencer logic 22 alternates turning on MOSFETs M5 and M6 of motor driver 14U. This causes terminal U to be connected alternately to terminal VCC or through resistor $R_s$ to terminal GND.

The pulse width modulation operation of one of the three motor drivers 14U, 14V and 14W while its respective terminal has the lowest voltage is controlled using peak current detection. The peak current detection control of motor controller 12 includes sense resistor $R_S$, current sense amplifier 24, current control DAC 26, comparator 28, one-shot 30, and sequencer logic 22. The peak current detection control senses current through motor 10 while the pulse width modulated terminal is low (i.e. when that terminal is connected through sense resistor $R_S$ to terminal GND). Current sense amplifier 24 senses voltage across resistor $R_S$, which represents the sensed motor current and provides the sensed motor current in the form of voltage $V_S$ to the positive (+) input terminal of comparator 28. The desired motor current is represented by a peak target voltage $V_T$ supplied by current control DAC 26 in response to a current command input signal which represents the normal operating current of motor 10.

Comparator 28 compares the output voltage $V_S$ of current sense amplifier 24 and the target voltage $V_T$ from DAC 26. When $V_S$ exceeds $V_T$, one-shot comparator 28 fires. This causes the output of one-shot 30 to go high for a programmable period of time. While one-shot 30 is high, sequencer logic 22 switches the motor driver for the pulse width modulated terminal so that the pulse width modulated terminal is connected to the high voltage (terminal VCC). This allows motor current to decay.

Each time a high-side commutation occurs while one-shot 30 is high, the current in the new floating terminal will be dumped into power supply terminal VCC. This is because while commutating to a new high terminal, the old high terminal will continue to pull current from terminal GND through the body diode of the lower MOSFET. If one-shot 30 was high prior to commutation, the low terminal would be in the high state of its pulse width modulation. The new high terminal will be held high, and therefore all the current in the inductance will be dumped into power supply terminal VCC. This reverse current may cause the power supply to become unstable.

Figure 2:
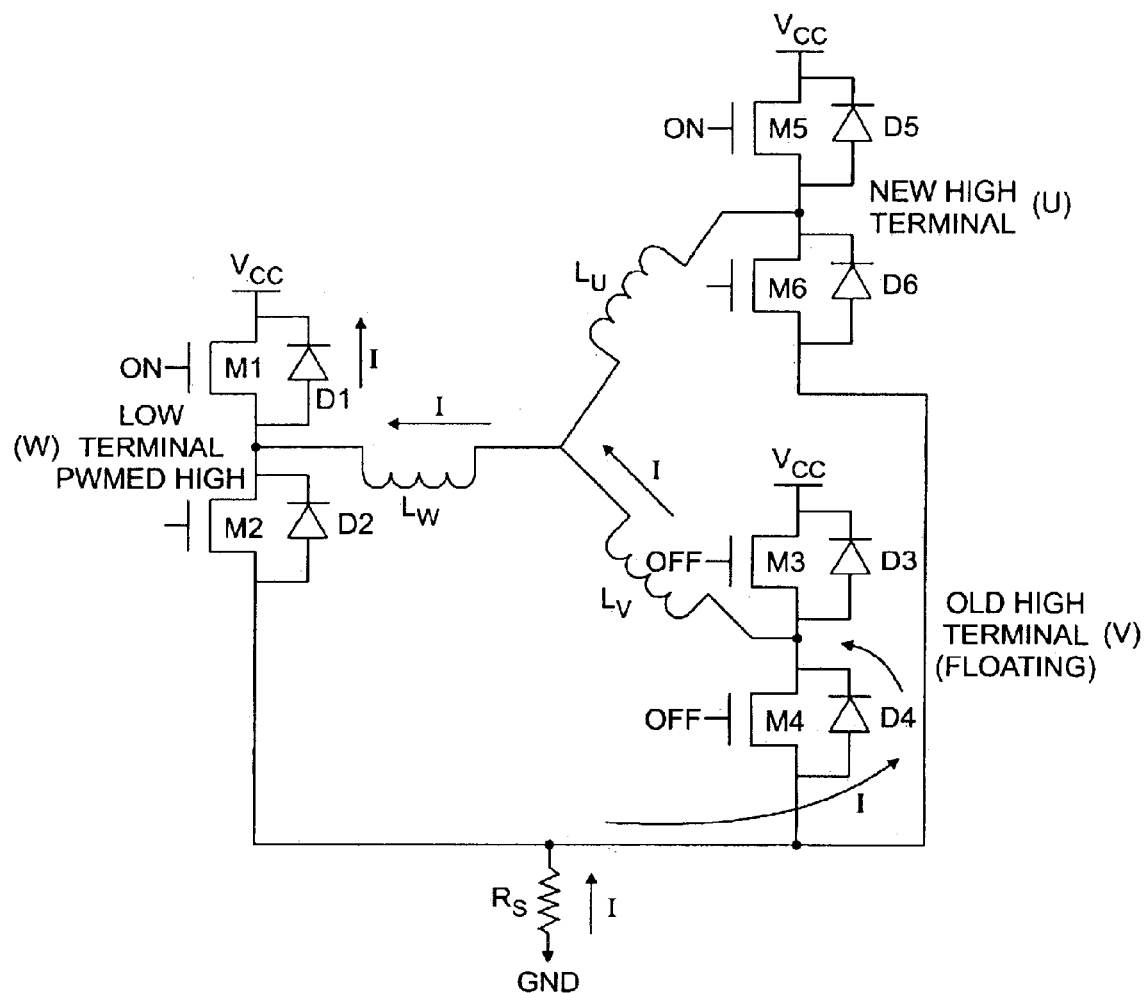
FIG. 2 is a circuit diagram of a three-phase motor bridge corresponding to FIG. 1 after a high-side commutation.

FIG. 2 is a circuit diagram of a motor bridge corresponding to motor controller 12 in FIG. 1. FIG. 2 shows the motor bridge after a high-side commutation (with one-shot 30 high). In this example, terminal U is the new high terminal, terminal V is the floating (old high) terminal, and terminal W is the low terminal. Accordingly, MOSFETs M1 and M5 are turned on, and MOSFETs M3 and M4 are turned off. As a result, motor current I will flow from power supply terminal GND through diode D4, through coils $L_V$ and $L_W$, and through MOSFET M1 into power supply terminal VCC. Because motor current I is flowing in the reverse direction into power supply terminal VCC, the power supply may become unstable and go into oscillation.

Figure 3:
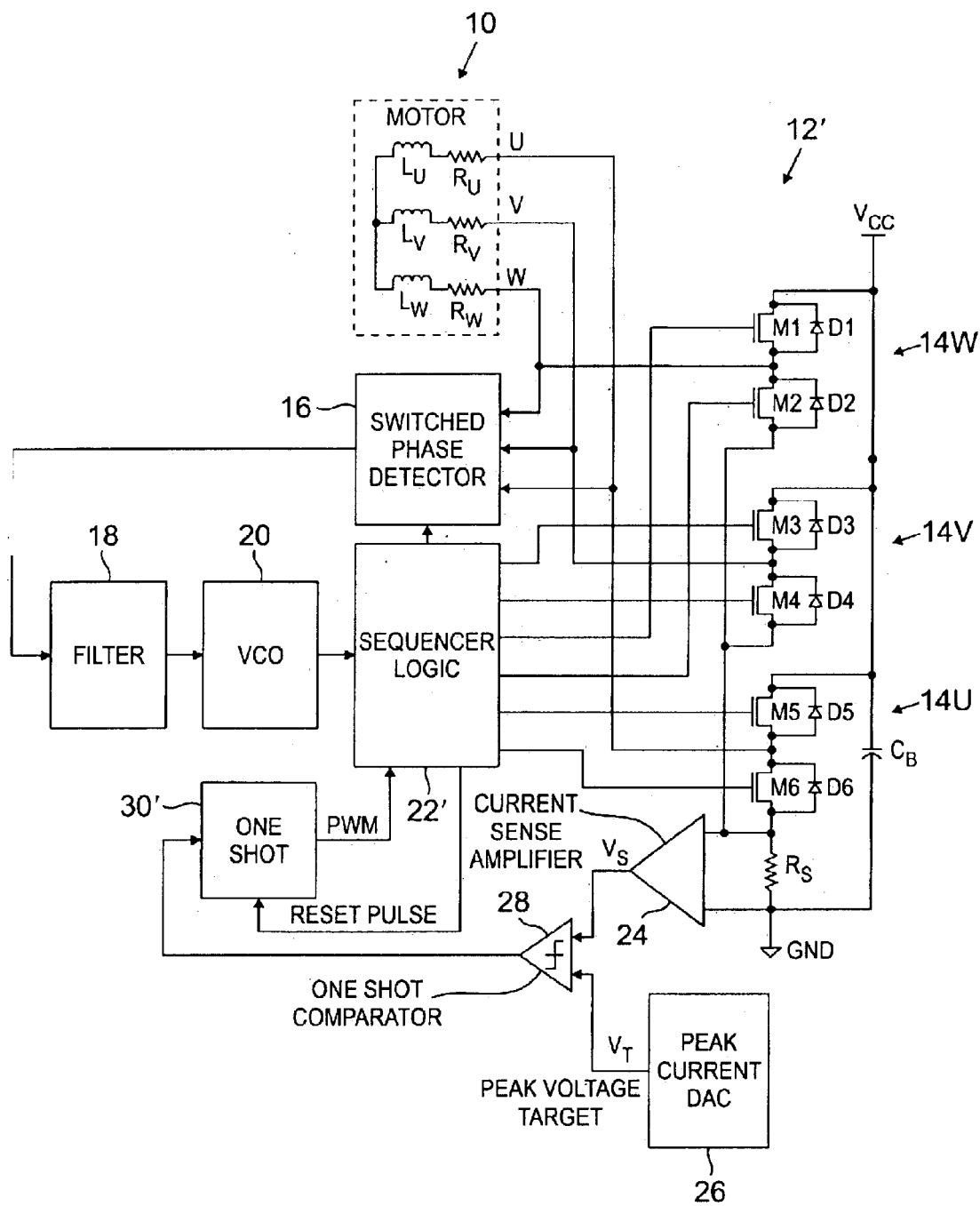
FIG. 3 is a block diagram of a motor controller of the present invention for a three-phase motor.

FIG. 3 is a block diagram showing three-phase motor 10 and motor controller 12' of the present invention. Motor controller 12' is somewhat similar to motor controller 12 in FIG. 1, and includes motor drivers 14U, 14V and 14W, switched phase detector 16, filter 18, voltage controlled oscillator (VCO) 20, sequencer logic 22', bypass capacitor $C_B$, current sense resistor $R_S$, current sense amplifier 24, current control digital-to-analog convertor (DAC) 26, one-shot comparator 28, and one-shot 30'. Power to motor controller 12' is supplied from a power supply (not shown) through power supply terminals VCC and GND.

Motor controller 12' differs from motor controller 12 in that motor controller 12' eliminates the reverse current problem by proper control of the motor phase pulse width modulation. Motor controller 12' adds a reset pulse from sequencer logic 22' into one-shot 30'. This involves re-programming sequencer logic 22' to provide an additional output signal and one-shot 30' to receive an additional input signal. The reset pulse is a short pulse (less than 1 μs) used to reset one-shot 30' during a high-side commutation. This corresponds to every other (or every even) commutation state. By resetting one-shot 30' at high-side commutations, the current is forced to re-circulate through the lower motor drivers instead of being dumped into power supply terminal VCC. Specifically, the current circulates through the lower diode of the floating (old high) terminal and the lower FET of the low terminal until the inductor current has discharged. As a result, the power supply remains stable without experiencing any reverse current.

Figure 4:
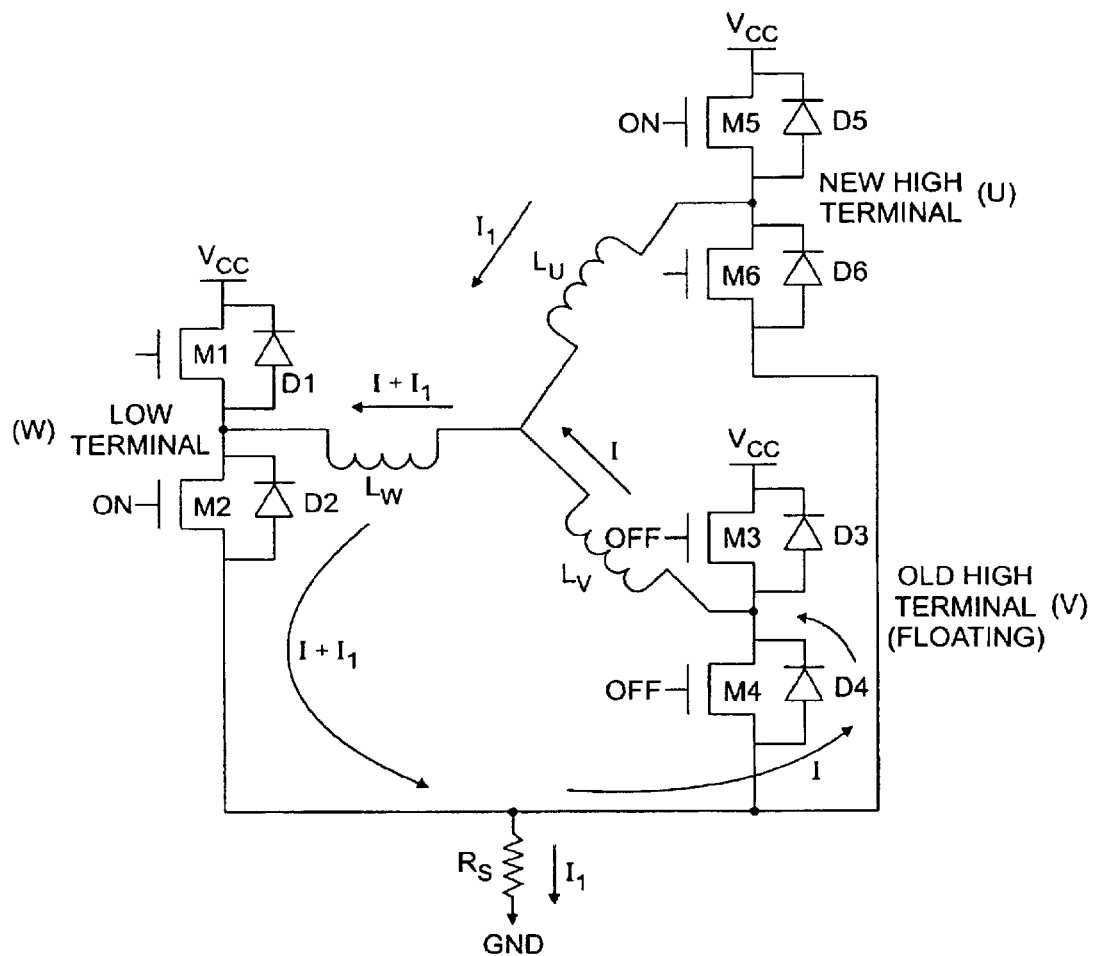
FIG. 4 is a circuit diagram of a three-phase motor bridge corresponding to FIG. 3 after a high-side commutation.

FIG. 4 is a circuit diagram of a motor bridge corresponding to motor controller 12' in FIG. 3. FIG. 4 shows the motor bridge after a high-side commutation (with one-shot 30 reset). Just as in the example in FIG. 2, terminal U is the new high terminal, terminal V is the floating (old high) terminal, and terminal W is the low terminal. However this time, MOSFETs M2 and M5 are turned on, and MOSFETs M3 and M4 are turned off. MOSFET M2 is turned on instead of M1 because one-shot 30 has been reset by sequencer logic 22'. As a result, motor current I will flow from power supply terminal GND through diode D4, through coils $L_V$ and $L_W$, through MOSFET M2 and continue to re-circulate until motor current I has discharged. Because motor current I is prevented from flowing into power supply terminal VCC, the power supply remains stable without going into oscillation. Normal motor current $I_1$ will charge from the power supply as a standard motor current.

In summary, the present invention introduces a simple and reliable method to eliminate the reverse current into the power supply that may occur during commutation of a pulse width modulated spindle controller. As a result, a less expensive power supply may be used, while still achieving the rapid spin up of the motor using six-state commutation and peak current control. The present invention makes use of circuitry already present, and therefore involves little additional expense while avoiding the use of a more expensive power supply, a more expensive supply bypass capacitor, or both. The motor controller of the present invention is preferably fabricated in an integrated circuit.

Although the present invention has been described with reference to preferred embodiments, workers skilled in the art will recognize that changes may be made in form and detail without departing from the spirit and scope of the invention.

What is claimed is:

1. A motor controller for an electric motor having plurality of motor terminals, the motor controller being connected to a power supply and comprising:
   a commutation control connected to the motor terminals for causing current pulses to flow through selected terminals during each commutation state;
   a current senor for providing a sense signal representative of the current pulses;
   a peak current target circuit for providing a target signal;
   a pulse width control for controlling pulse width of the current pulses as a function of the sense signal and the target signal wherein the pulse width control includes a comparator which compares the sense signal and the target signal and a pulse generator which supplies a control pulse to the commutation control when the comparator provides an output indicating that the sense signal has reached the target signal; and
   a reverse current control for preventing reverse current from flowing into the power supply during change of commutation state, wherein the reverse current control resets the pulse generator at the start of each change of commutation state in which a new motor terminal is connected to a high power supply voltage.

2. The motor controller of claim 1, wherein the commutation control terminates the current pulse in response to the control pulse from the pulse generator.

3. The motor controller of claim 1, wherein the peak current target circuit provides the target signal as a function of a current command representative of a desired motor current.

4. The motor controller of claim 1, wherein the motor has N motor terminals and the commutation control defines 2N commutation states.

5. The motor controller of claim 4, wherein N=3.

6. The motor controller of claim 1, wherein the motor controller is fabricated in an integrated circuit.

7. A motor controller for controlling speed of an electric motor having a plurality of terminals, the motor controller being connected to a power supply and comprising:
   a plurality of motor drivers connected to the plurality of terminals;
   sequencer logic for providing control signals to the motor drivers to cause current pulses to flow through selected terminals during each commutation state, the sequencer logic providing a reset signal for preventing reverse current from flowing into the power supply during change of commutation state;
   a current sensor for providing a sense signal representative of the current pulses;
   a peak current target circuit for providing a target signal which is a function of a current command signal; and
   a pulse width control for controlling pulse width of the current pulses as a function of the sense signal, the target signal and the reset signal.

8. The motor controller of claim 7, wherein the pulse width control includes a comparator which compares the sense signal and the target signal and a pulse generator which supplies a control pulse to the sequencer logic as a function of an output from the comparator and the reset signal.

9. The motor controller of claim 8, wherein the sequencer logic terminates the current pulse in response to a control pulse form the pulse generator.

10. The motor controller of claim 8, wherein the reset signal resets the pulse generator at the start of each change of commutation state in which a new motor terminal is connected to a high power supply voltage.

11. The motor controller of claim 7, wherein the current command signal is representative of a desired motor current.

12. The motor controller of claim 7, wherein each motor driver includes a first switch connected to the power supply.

13. The motor controller of claim 12, wherein the reset signal turns off the first switch of a low terminal motor driver at the start of each change of commutation state in which a new motor terminal is connected to a high power supply voltage.

14. The motor controller of claim 12, wherein the first switch is a MOSFET.

15. The motor controller of claim 7, wherein the motor controller is fabricated in an integrated circuit.

16. A motor controller for an electric motor having a plurality of motor terminals, the motor controller comprising:
   a plurality of motor drivers connected to the plurality of motor terminals;
   sequencer logic for commutating the motor by providing control signals to the motor drivers to drive a first of the motor terminals to a high voltage, drive a second of the motor terminals to an intermediate voltage, and alternately drive a third of the motor terminals between the high voltage and a low voltage; and
   reverse current control for driving the third motor terminal to the low voltage upon the occurrence of a high side commutation.

17. The motor controller of claim 16 and further comprising:
   a pulse width modulator for generating a pulse width modulated signal for use by the sequencer logic in alternately driving the third of the motor terminals between the high voltage and the low voltage.

18. The motor controller of claim 17 wherein reverse current control is logic residing in the sequencer logic for detecting the occurrence of a high side commutation and for providing a reset signal to the pulse width modulator upon the occurrence of a high side commutation.

19. The motor controller of claim 18, wherein the pulse width modulator comprises:
   a current sensor for providing a sense signal representative of the current flowing through the motor;
   a peak current target circuit for providing a target signal which is a function of a current command signal; and
   a comparator which compares the sense signal and the target signal; and
   a pulse generator which supplies a control pulse to the sequencer logic as a function of an output from the comparator and the reset signal.

* * * * *

UNITED STATES PATENT AND TRADEMARK OFFICE
CERTIFICATE OF CORRECTION

| | | |
|---|---|---|
| PATENT NO. | : 6,917,172 B2 | Page 1 of 1 |
| APPLICATION NO. | : 10/614262 | |
| DATED | : July 12, 2005 | |
| INVENTOR(S) | : Jason P. Brenden et al. | |

It is certified that error appears in the above-identified patent and that said Letters Patent is hereby corrected as shown below:

Column 7, Line 5, after "having", insert --a--

Column 7, Line 11, delete "senor", insert --sensor--

Column 7, Line 12, delete "signal", insert --signal,--

Signed and Sealed this

Nineteenth Day of December, 2006

JON W. DUDAS
*Director of the United States Patent and Trademark Office*